Jan. 12, 1965   S. BURGEN   3,165,137
ANTI-SKID DEVICE
Filed April 8, 1963   4 Sheets-Sheet 2
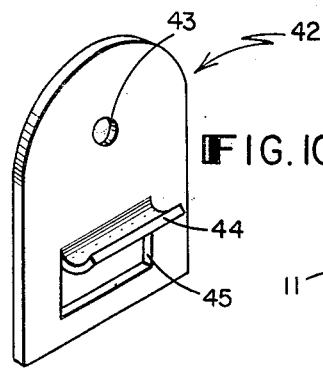
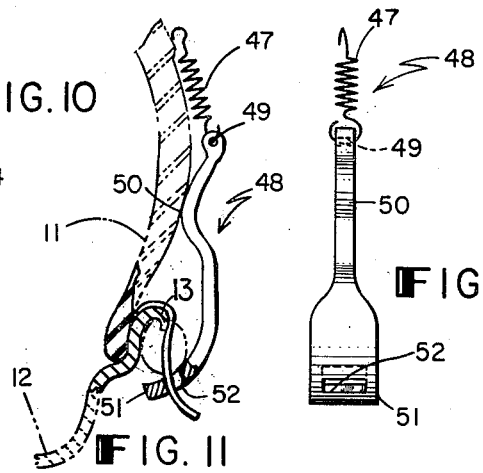
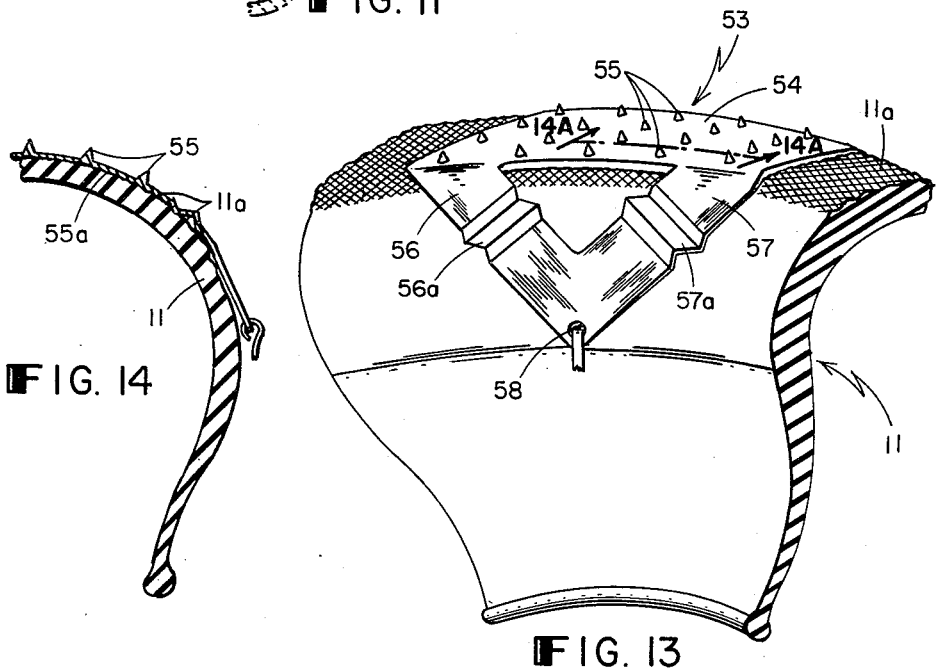
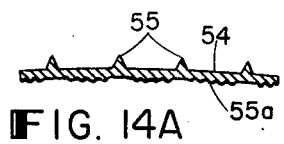
SAMUEL BURGEN,
INVENTOR.
BY
ATTORNEY.

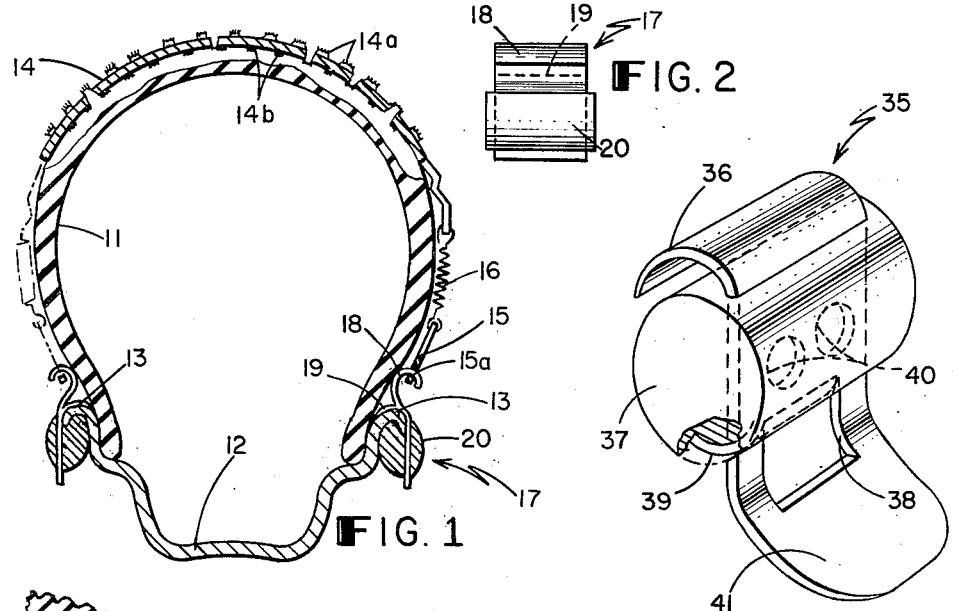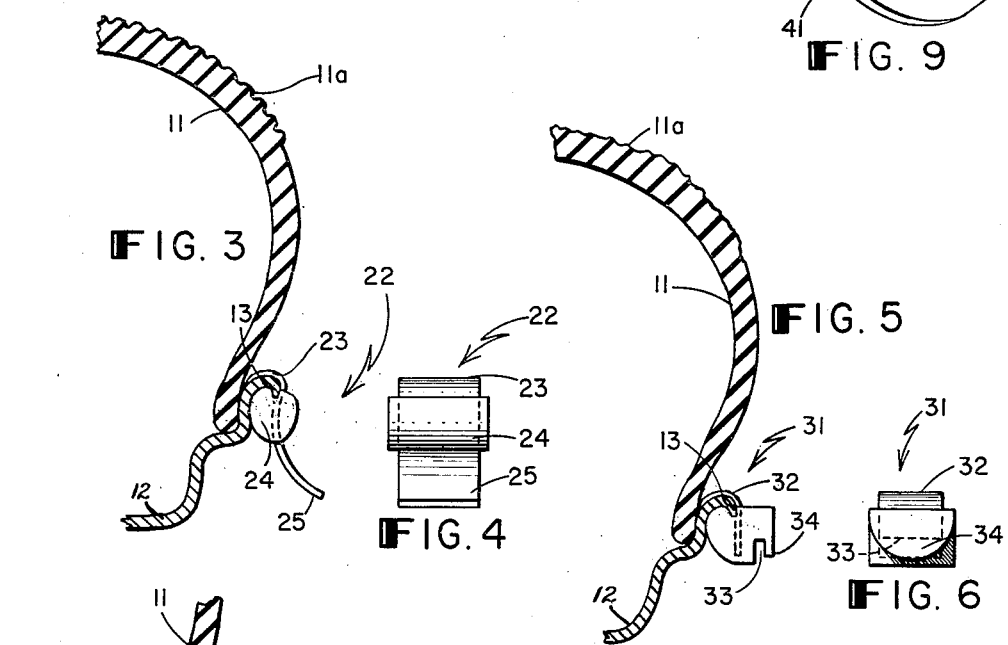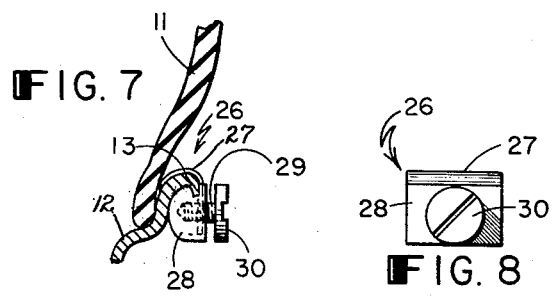

Jan. 12, 1965 S. BURGEN 3,165,137
ANTI-SKID DEVICE
Filed April 8, 1963 4 Sheets-Sheet 3
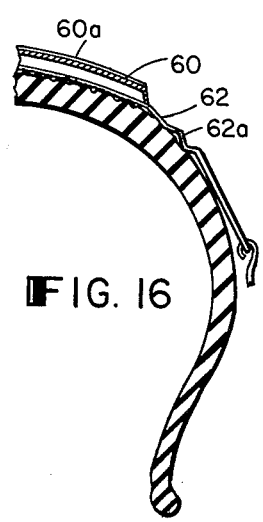
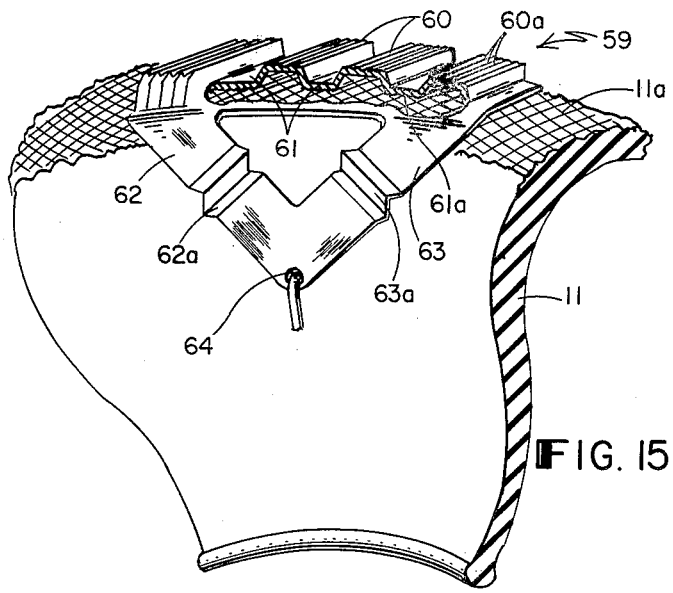
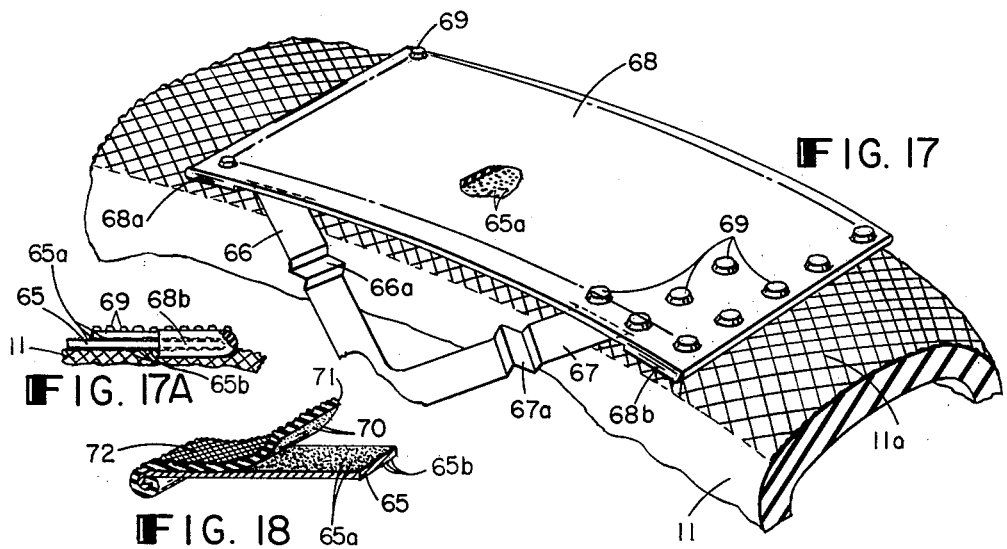
SAMUEL BURGEN,
INVENTOR.
BY
ATTORNEY.

Jan. 12, 1965  S. BURGEN  3,165,137
ANTI-SKID DEVICE
Filed April 8, 1963  4 Sheets-Sheet 4
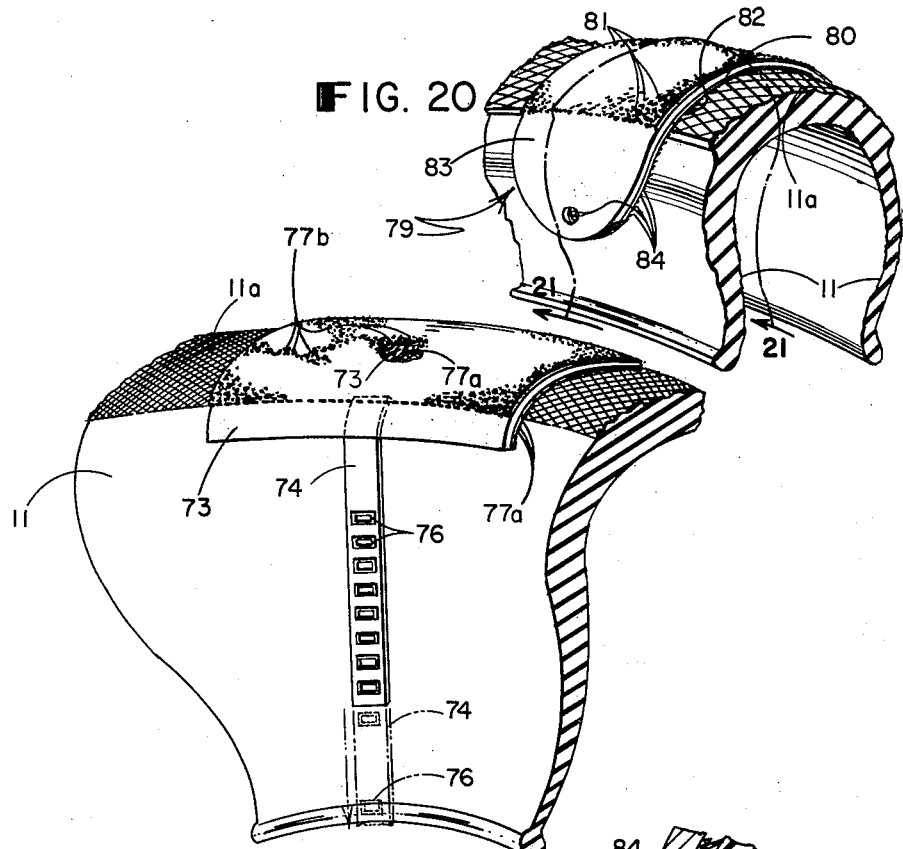
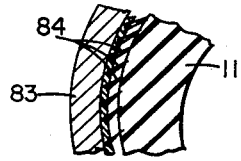
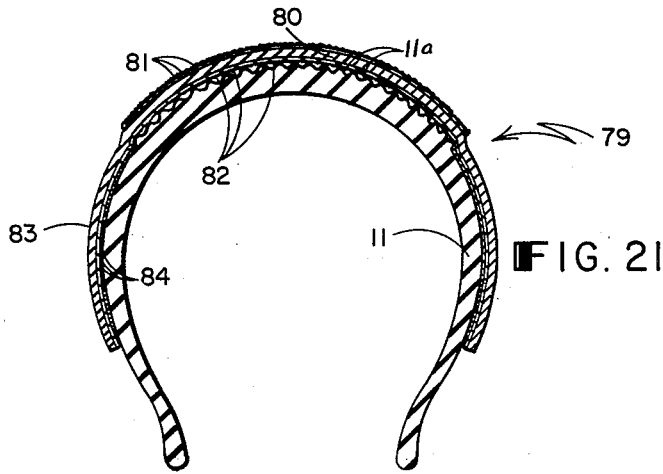
SAMUEL BURGEN,
INVENTOR.
BY
ATTORNEY.

United States Patent Office 3,165,137
Patented Jan. 12, 1965

3,165,137
ANTI-SKID DEVICE
Samuel Burgen, 60 Mason Terrace, Brookline, Mass.
Filed Apr. 8, 1963, Ser. No. 271,233
4 Claims. (Cl. 152—236)

This invention relates to an anti-skid device for vehicle wheels. In particular it relates to such a device which can be used as an emergency traction device where the vehicle is unable to move out of ice, mud or snow.

Although many devices and methods have been proposed to give traction to a vehicle on ice, mud or snow, all such devices have one or more disadvantages. A full set of chains, for example, while effective in providing traction, is extremely difficult to put onto a wheel under normal circumstances and almost impossible when the wheels themselves are imbedded in ice, mud or snow. So-called snow tires which have a very deep and angular tread have only limited traction in snow or mud and almost no traction on ice. Further, because of the difficulty in the installation and removal of full chains, the user is required to keep them on the wheels for considerable periods of time, which results in rapid deterioration of chains. In the case of snow tires, the excessive tread height causes rapid wear of the tread as well as the annoying noises known as "singing."

It has also been previously proposed to use so-called emergency chains which are a number of short links going across the tread to a strap which is then threaded through the wheel and fastened together. Such emergency chains are difficult to fasten properly and slip easily. In addition, because of the design of the modern automobile wheels, it is impossible in most cases to thread a strap through from one side of the wheel to the other.

One object of the present invention is to provide an emergency traction device for an automobile wheel which can be easily attached to or removed from the tire and which can be held firmly in position for the desired time interval. Another object of this invention is to provide such a device which is useful on ice.

Other objects and advantages of this invention will be apparent from the specifications and claims which follow, taken together with the appended drawings herein.

FIG. 1 shows, in side view, one embodiment of this invention in position on a vehicle tire and rim shown in partial section.

FIG. 2 is a front elevation of the double-prong anchor of FIG. 1.

FIG. 3 is a side view of a single prong anchor in position on a tire and rim shown in partial section.

FIG. 4 is a front elevation of the anchor illustrated in FIG. 3.

FIG. 5 is a side view of another form of anchor in position on a tire and rim shown in partial section.

FIG. 6 is a front elevation of the anchor of FIG. 5.

FIG. 7 is a side view of an anchor having a screw head in position on a tire and rim shown in partial section.

FIG. 8 is a front elevation of the anchor of FIG. 7.

FIG. 9 is a perspective view of an anchor having a slot and tongue.

FIG. 10 is a perspective view of a connector.

FIG. 11 is a side view of a different form of connector.

FIG. 12 is a front view of the connector of FIG. 11.

FIG. 13 is a partial oblique perspective view of a traction element in position on a tire.

FIG. 14 is a partial side view of FIG. 13 with the tire shown in section.

FIG. 14A is a partial section of the traction element along line 14A—14A of FIG. 13.

FIG. 15 is a partial oblique perspective view of a corrugated traction element in position on a tire.

FIG. 16 is a partial side view of FIG. 15 with the tire shown in section.

FIG. 17 is an oblique top perspective view of a combination traction device on position on a tire, with the top surface incomplete and partially broken away.

FIG. 17A is a partial side view of FIG. 17, with the tire in section.

FIG. 18 is a partial perspective-section view of a different pad on the traction element of FIG. 17.

FIG. 19 is a perspective view of a fibre-glass traction member in position on a tire shown in partial section.

FIG. 20 is a perspective view of another form of this invention in position on a tire shown in partial section.

FIG. 21 is a section through the device illustrated in FIG. 20. FIG. 21A is an enlarged portion of FIG. 21.

The invention comprises generally a moderately flexible traction element which fits over a portion of a tread of a tire and is characterized as having a rough exterior surface and a rough surface contacting the tread of the tire.

In one form of this invention, the sides of the traction element fit over a substantial portion of the side wall of the tire to provide sufficient gripping action. Such gripping action is enhanced by angular flexible projections on the inner surface of the sides of the traction element directed towards the tread.

Another form of the invention comprises generally an anchor, and a tension member attached to the anchor, and to one side of a traction element mounted on the tread of the tire, the traction element being connected on the other side to similar tension and anchor units. The anchor is characterized as being a strong strip having an upper inwardly-bent hook and being partially embedded in a malleable block which forms a curved notch with the hook for engaging the lip of the wheel rim adjacent the tire. Connectors of various designs as hereinafter illustrated can be used for attachment of the tension member to the anchor. The tension member is preferably a slotted rubber strip or a spring attached to holes in the connector and traction element. The traction element is characterized, as in the first form of the invention, as being made of a moderately flexible frame with an irregular or rough surface on both the portion adjacent to the tread of the tire as well as the outer or road portion. The traction element can be either unitary or compound. In its compound form the traction element holds a rough-surfaced resilient pad.

Various materials of construction can be used in this invention, provided they have the requisite strength and flexibility. It is preferred that the anchor frame be made of a sturdy material, such as steel, and that the malleable metal body be a material such as lead or aluminum. The tension member can be a steel spring or may be a rubber strap. The traction element can be of any sufficiently strong rigid material having moderate flexibility, as for example sheet metal, plastic, rubber, laminates, or fibre impregnated with plastic or resin.

A number of embodiments of the various elements of this invention are illustrated in the appended drawings.

FIGS. 1 and 2 illustrate an assembly of anchor 17 engaging the lip 13 of a rim 12 on which is mounted a tire 11 having tread 11a. The anchor 17 has an upper hook 19 engaging the lip and a connecting hook 18. The base of the anchor is embedded in a malleable metal block 20, such as aluminum, which forms a notch with hook 19 for engaging lip 13. The hook 18 of the anchor engages a slot 15a in connector 15 which in turn is connected by spring 16 to the side of a steel traction member 14 having outward tread prongs 14A and inwardly directed gripping prongs 14B. There is a similar, though not illustrated, anchor-connector-spring assembly on the other side of the tire.

FIGS. 3 and 4 illustrate an anchor 22 which has a single upper hook 23 spaced away from the malleable metal body 24 and has an arm 25 for engaging the connector.

FIGS. 5 and 6 illustrate an anchor 31 having an upper hook 32 and a malleable metal body which has a bottom notch 33 with an end flange 34 for engaging the connector.

FIGS. 7 and 8 illustrate an anchor 26 which has a single upper hook 27 spaced away from a body of malleable metal 28 to form a notch for engaging rim lip 13. In this case a screw 29 is partially imbedded in the metal 28 so as to leave a small projection and head 30 for engagement with a connector.

FIG. 9 illustrates an anchor 35 which has an upper hook 36 spaced away from a malleable metal body 37 to form the rim lip engaging notch. Below the metal body is an opening 38 formed by pushing out a supporting tongue 39 to the rear and an arm 41. The phantom holes 40 indicate how the malleable metal body is retained in its position.

FIG. 10 illustrates a connector 42 which has a hole 43 for engaging the spring and a slot 45 for engaging an anchor formed by a portion of the connector pushed out to provide a finger grip 44.

FIGS. 11 and 12 illustrate a connector 48 having an outward bulge 50 and an inward bulge 51 with a hole 49 for attachment to the spring 47 and a slot 52 for engaging the anchor.

FIGS. 13, 14, and 14A illustrate a unitary spring steel traction element 53 having bent-over and punched-out side portions 56 and 57 which meet at 58 for attachment to spring 47. The upper surface 54 has outward spikes 55 and inward spikes 55A. The side portions also have pleats 56A and 57A.

FIGS. 15 and 16 show a traction element 59 which has upper transverse corrugations 60 with ridges 60A as well as lower transverse corrugations 61 with ridges 61A. This traction element has similar pleated side portions 62 and 63 which connect at an angle and have a hole 64 for attachment to a spring.

FIGS. 17 and 17A show a combination traction element comprising a steel support sheet 65 with side portions 66 and 67 and rough outer surface 65A and inner surface 65B. A rubber pad 68 is inserted on the support 65 by means of pockets 68A and 68B. The pad 68 is covered with protrusions 69 normally formed integrally with the pad.

FIG. 18 illustrates a portion of a different pad 71 having a roughened or embossed outer surface 72 lifted away from an abrasive surface 65A on support 65 so as to show the abrasive undersurface 70 of the pad.

FIG. 19 shows a fibre-glass traction member 73 held by rubber straps, e.g., 74 having slots 76 for attachment to the arm of the anchor. Both the inner face 77A and the outer face 77B of the traction member 73 have an abrasive surface.

The embodiment of the invention illustrated in FIGS. 20, 21 and 21A shows the form of the invention wherein the sides of the traction element fit over a substantial portion of the side wall of the tire. The tension element and rim anchor are not used. The metal sheet 79 has a portion 80 fitting over the tread of the tire and has two side portions (e.g., 83), extending over and conforming to the shape of a substantial portion of the side wall of the tire. The inner surface of the tread portion 80 has a layer of abrasive particles 82 and the outer surface of the tread has a layer of abrasive particles 81. The inner surface of the side portions have rubber projections 84, directed toward the tread of the tire and tending to keep the traction element in place.

This latter embodiment can be formed of other material than metal, as for example, rubber, plastic, or fibre-glass. Further, a thin lattice or open mesh made of rubber or other flexible material can be adhered to or formed in the side wall of the tire to further enhance the gripping action of the projection 84.

The term "rough" as used to describe the surfaces of the traction member in the appended claims is intended to include surface irregularities, embossing, protrusions and embedded hard particles such as abrasives.

Although various embodiments of this invention have been described in detail, it is to be understood that this invention is not to be limited to these embodiments and that many obvious changes in detail and structure may be made without departing from the spirit and scope of the invention.

I claim:

1. An anchor for use in conjunction with a wheel having a rim with a lip and a tire mounted on said rim, comprising a substantially flat body member having a hook and being embedded in a block of malleable metal so as to form a lip-engaging notch with said hook; said body member extending through said block to provide an arm.

2. An anchor for use in conjunction with a wheel having a rim with a lip and a tire mounted on said rim, comprising a substantially flat body member having a hook and being embedded in a block of malleable metal so as to form a lip-engaging notch with said hook; said body member extending through said block to form an arm, a portion of which arm being pushed out to form a seat for said block.

3. An anchor for use in conjunction with a wheel having a rim with a lip and a tire mounted on said rim, comprising a substantially flat body member having a hook and being embedded in a block of malleable metal so as to form a lip-engaging notch with said hook; an attaching notch being provided.

4. An anchor for use in conjunction with a wheel having a rim with a lip and a tire mounted on said rim, comprising a substantially flat body member having a hook and being embedded in a block of malleable metal so as to form a lip-engaging notch with said hook; a portion of said body member being bent to form a connecting hook, curved oppositely to said first hook.

References Cited by the Examiner

UNITED STATES PATENTS

| 1,753,349 | 4/30 | Perks | 152—222 |
| 2,469,997 | 5/49 | Simpson | 301—5 |
| 2,498,523 | 2/50 | Bergen | 152—222 |
| 2,681,094 | 6/54 | Donaldson | 152—236 |
| 2,726,699 | 12/55 | Slotta | 152—236 |

ARTHUR L. LA POINT, *Primary Examiner.*